US012617524B2

(12) United States Patent
Allen

(10) Patent No.: US 12,617,524 B2
(45) Date of Patent: May 5, 2026

(54) UPLOCK UNLOCK ELECTRO-HYDROSTATIC ACTUATOR

(71) Applicant: Goodrich Corporation, Charlotte, NC (US)

(72) Inventor: Jason Bradley Allen, Waco, TX (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 18/626,756

(22) Filed: Apr. 4, 2024

(65) Prior Publication Data

US 2025/0313334 A1 Oct. 9, 2025

(51) Int. Cl.
| | |
|---|---|
| *B64C 25/26* | (2006.01) |
| *B64C 25/22* | (2006.01) |
| *F04B 17/04* | (2006.01) |
| *F15B 11/08* | (2006.01) |

(52) U.S. Cl.
CPC .............. *B64C 25/26* (2013.01); *B64C 25/22* (2013.01); *F04B 17/04* (2013.01); *F15B 11/08* (2013.01); *F15B 2211/212* (2013.01)

(58) Field of Classification Search
CPC ......... B64C 25/22; B64C 25/26; F04B 17/04; F15B 11/08; F15B 2211/212
See application file for complete search history.

(56) References Cited

U.S. PATENT DOCUMENTS

| | | | | |
|---|---|---|---|---|
| 3,504,406 | A | * | 4/1970 | Schott ..................... E05B 65/00 294/82.26 |
| 4,272,225 | A | * | 6/1981 | Fujinaka ................. F16N 13/10 310/317 |
| 4,376,618 | A | * | 3/1983 | Toyoda ................. F04B 17/046 417/417 |
| 4,455,127 | A | * | 6/1984 | Tabuchi ................... F04B 5/00 417/418 |
| 8,556,209 | B2 | | 10/2013 | Luce |
| 9,580,058 | B2 | * | 2/2017 | Howell ................. B60T 13/662 |
| 11,180,244 | B2 | * | 11/2021 | Evans ..................... F15B 15/06 |
| 11,332,958 | B2 | | 5/2022 | Macaraeg, Jr. |
| 11,466,791 | B2 | | 10/2022 | Lindahl |
| 2023/0296118 | A1 | | 9/2023 | Roger et al. |
| 2024/0228027 | A1 | * | 7/2024 | Love .................... B60T 13/686 |

FOREIGN PATENT DOCUMENTS

CN 117184416 12/2023

* cited by examiner

*Primary Examiner* — Dustin T Nguyen
(74) *Attorney, Agent, or Firm* — SNELL & WILMER L.L.P.

(57) ABSTRACT

An electrohydrostatic actuator (EHA) for unlocking a uplock of an aircraft is provided, the EHA includes a solenoid, a plunger, a first manifold, and an unlock mechanism. The plunger is mechanically coupled to the solenoid. Responsive to the solenoid being energized, the solenoid is configured to translate the plunger in a first direction to push a hydraulic fluid into the first manifold that feeds the unlock mechanism. Responsive to a command to unlock the uplock of the aircraft, the hydraulic fluid is pushed to the unlock mechanism thereby causing the unlock mechanism to maneuver an over-centered mechanism over a centerline and unlock a uplocked landing gear.

16 Claims, 5 Drawing Sheets

UPLOCK UNLOCK ELECTRO-HYDROSTATIC ACTUATOR

FIELD

The present disclosure relates to landing gear, and more specifically, to an electro-hydrostatic actuator for unlocking an uplock mechanism that retains the landing gear in a up position.

BACKGROUND

Landing gear actuation systems generally utilize hydraulic components that work with a central or a localized hydraulic system. As aircraft become more advanced there is a need for an electric landing gear actuation system that does not use a hydraulic system.

SUMMARY

An electrohydrostatic actuator (EHA) is provided for unlocking a uplock of an aircraft. The EHA includes a solenoid, a plunger, a first manifold, and an unlock mechanism. The plunger is mechanically coupled to the solenoid. Responsive to the solenoid being energized, the solenoid is configured to translate the plunger in a first direction to push a hydraulic fluid into the first manifold that feeds the unlock mechanism. Responsive to a command to unlock the uplock of the aircraft, the hydraulic fluid is pushed to the unlock mechanism, thereby causing the unlock mechanism to maneuver an over-centered mechanism over a centerline and unlock a uplocked landing gear.

In various embodiments, wherein the plunger is positioned within a first chamber. In various embodiments, the first manifold is fluidly coupled to the first chamber. In various embodiments, the hydraulic fluid comprises a first portion and a second portion. In various embodiments, a translation of the plunger in the first direction pushes the first portion of the hydraulic fluid to the first manifold.

In various embodiments, the EHA further includes an extension. In various embodiments, a first end of the extension is mechanically coupled to the plunger. In various embodiments, a second end of the extension is positioned within a second chamber. In various embodiments, the first manifold is fluidly coupled to the second chamber. In various embodiments, the translation of the plunger in the first direction translates the extension in the first direction. In various embodiments, a translation of the extension in the first direction pushes the second portion of the hydraulic fluid into the first manifold.

In various embodiments, the EHA further includes an unloading valve and a reservoir. In various embodiments, responsive to a pressure in the first manifold exceeding predetermined pressure, the unloading valve redirects the second portion of the hydraulic fluid to the reservoir.

In various embodiments, the EHA further includes a second manifold. In various embodiments, the unloading valve redirects the second portion of the hydraulic fluid to the reservoir via the second manifold.

In various embodiments, responsive to the command to unlock the uplock of the aircraft ending, pushing the hydraulic fluid in the reservoir into at least one of the first chamber or the second chamber while the plunger is being spring-returned to a first position from a second position in a second direction opposite the first direction.

In various embodiments, further includes an accumulator. In various embodiments, the accumulator is fluidly coupled to the first manifold. In various embodiments, responsive to a command to charge the accumulator, the hydraulic fluid is pushed to the accumulator.

In various embodiments, responsive to the command to unlock the uplock of the aircraft, the hydraulic fluid from the accumulator is pushed to the unlock mechanism thereby causing the unlock mechanism to maneuver the over-centered mechanism over the centerline and unlock the uplocked landing gear.

In various embodiments, the EHA further includes a relief valve and a reservoir. In various embodiments, the relief valve is configured to open in response to an overload pressure in the first manifold. In various embodiments, responsive to the relief valve opening in response to the overload pressure, an excess hydraulic fluid is released into the reservoir.

In various embodiments, the EHA further includes a directional valve. In various embodiments, the command to unlock the uplock of the aircraft activates the directional valve so that the hydraulic fluid is pushed to the unlock mechanism.

Also disclosed herein is an aircraft. The aircraft includes a landing gear and an electrohydrostatic actuator (EHA) for unlocking the landing gear in an uplocked position. The EHA includes a solenoid, a plunger, a first manifold, and an unlock mechanism. The plunger is mechanically coupled to the solenoid. Responsive to the solenoid being energized, the solenoid is configured to translate the plunger in a first direction to push a hydraulic fluid into the first manifold that feeds the unlock mechanism. Responsive to a command to unlock the uplock of the aircraft, the hydraulic fluid is pushed to the unlock mechanism, thereby causing the unlock mechanism to maneuver an over-centered mechanism over a centerline and unlock a uplocked landing gear.

In various embodiments, wherein the plunger is positioned within a first chamber. In various embodiments, the first manifold is fluidly coupled to the first chamber. In various embodiments, the hydraulic fluid comprises a first portion and a second portion. In various embodiments, a translation of the plunger in the first direction pushes the first portion of the hydraulic fluid to the first manifold.

In various embodiments, the EHA further includes an extension. In various embodiments, a first end of the extension is mechanically coupled to the plunger. In various embodiments, a second end of the extension is positioned within a second chamber. In various embodiments, the first manifold is fluidly coupled to the second chamber. In various embodiments, the translation of the plunger in the first direction translates the extension in the first direction. In various embodiments, a translation of the extension in the first direction pushes the second portion of the hydraulic fluid into the first manifold.

In various embodiments, the EHA further includes an unloading valve and a reservoir. In various embodiments, responsive to a pressure in the first manifold exceeding predetermined pressure, the unloading valve redirects the second portion of the hydraulic fluid to the reservoir.

In various embodiments, the EHA further includes a second manifold. In various embodiments, the unloading valve redirects the second portion of the hydraulic fluid to the reservoir via the second manifold.

In various embodiments, responsive to the command to unlock the uplock of the aircraft ending, pushing the hydraulic fluid in the reservoir into at least one of the first chamber or the second chamber while the plunger is being spring-returned to a first position from a second position in a second direction opposite the first direction.

In various embodiments, further includes an accumulator. In various embodiments, the accumulator is fluidly coupled to the first manifold. In various embodiments, responsive to a command to charge the accumulator, the hydraulic fluid is pushed to the accumulator.

In various embodiments, responsive to the command to unlock the uplock of the aircraft, the hydraulic fluid from the accumulator is pushed to the unlock mechanism thereby causing the unlock mechanism to maneuver the over-centered mechanism over the centerline and unlock the uplocked landing gear.

In various embodiments, the EHA further includes a relief valve and a reservoir. In various embodiments, the relief valve is configured to open in response to an overload pressure in the first manifold. In various embodiments, responsive to the relief valve opening in response to the overload pressure, an excess hydraulic fluid is released into the reservoir.

In various embodiments, the EHA further includes a directional valve. In various embodiments, the command to unlock the uplock of the aircraft activates the directional valve so that the hydraulic fluid is pushed to the unlock mechanism.

The foregoing features and elements may be combined in various combinations without exclusivity, unless expressly indicated herein otherwise. These features and elements as well as the operation of the disclosed embodiments will become more apparent in light of the following description and accompanying drawings.

Figure 1:
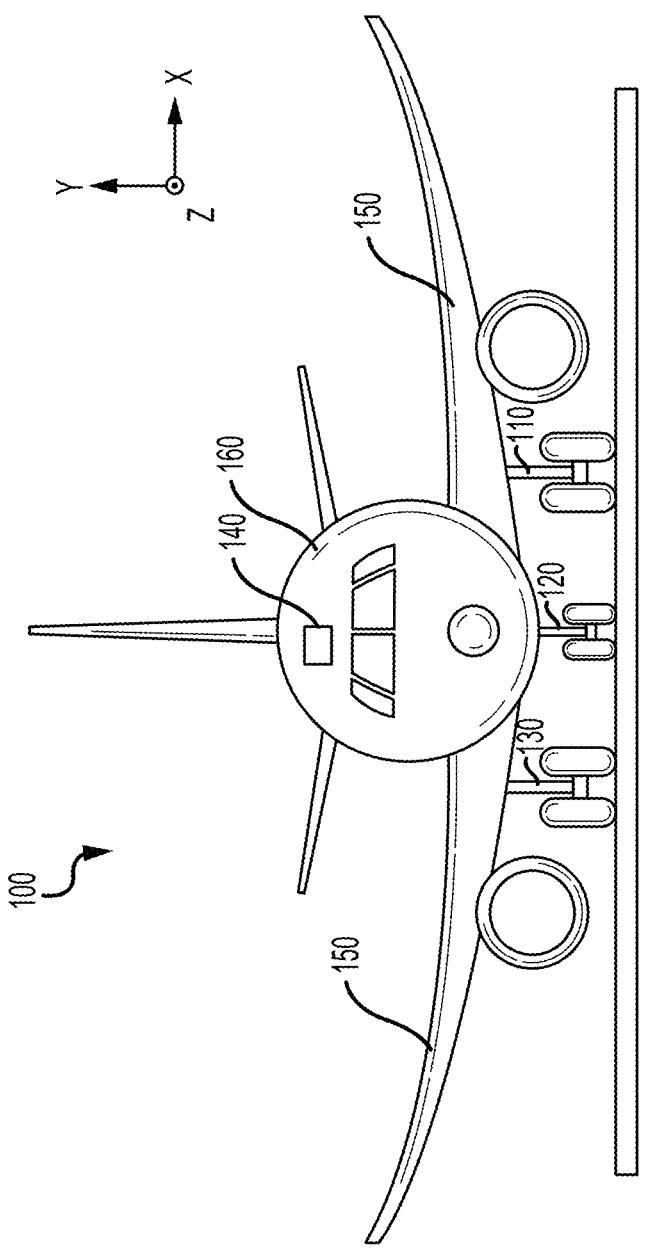
FIG. 1 illustrates an aircraft, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an," or "the" may include one or more than one and that reference to an item in the singular may also include the item in the plural. Further, all ranges may include upper and lower values and all ranges and ratio limits disclosed herein may be combined.

Electro-hydrostatic actuators (EHAs) may be expensive, since each EHA includes an electric motor, pump, valves, and/or a reservoir, among other components and their use in multiple locations in a single landing gear bay multiplies their total cost. Disclosed herein is an EHA that replaces a relatively high-cost rotary electric motor and hydraulic pump within typical EHA with a reciprocating solenoid/plunger. In various embodiments, the solenoid/plunger may operate at roughly 5-10 Hertz (Hz) using a switch operating on a cam. In various embodiments, the plunger pump may have dual cavities with an unloading valve coupled to one of the cavities to increase flow output at low to medium pressures, thus allowing faster accumulator re-charge time. In various embodiments, the accumulator provides most of the energy needed to actuate the uplock unlock cylinder. In various embodiments, an accumulator pressure switch ensures that the accumulator remains charged and the plunger pump is turned off in response to a target pressure being reached.

Referring now to FIG. 1, an aircraft 100 includes multiple landing gear systems, including a first landing gear assembly 110, second landing gear assembly 120, and third landing gear assembly 130 is illustrated. The first landing gear assembly 110, the second landing gear assembly 120, and the third landing gear assembly 130 each include one or more wheel assemblies. The first landing gear assembly 110, the second landing gear assembly 120, and the third landing gear assembly 130 support the aircraft 100 when the aircraft 100 is not flying, thereby allowing the aircraft 100 to take off, land, and taxi without damaging the aircraft 100. In various embodiments, the second landing gear assembly 120 is also a nose landing gear for the aircraft 100, and often times, one or more of the first landing gear assembly 110, the second landing gear assembly 120, and the third landing gear assembly 130 are operationally retractable into the aircraft 100 when the aircraft 100 is in flight and/or airborne.

The first landing gear assembly 110, the second landing gear assembly 120, and the third landing gear assembly 130 may each include various shock and strut assemblies with one or more wheels attached thereto. The first landing gear assembly 110, the second landing gear assembly 120, and the third landing gear assembly 130 may each be configured to translate between a landing gear down position, wherein the landing gear extend from wings 150 and/or from fuselage 160 to support the aircraft 100, and a landing gear up position, wherein the landing gear are located within the wings 150 and/or the fuselage 160 of the aircraft 100. For example, during taxiing, take-off, and landing, the first landing gear assembly 110, the second landing gear assembly 120, and the third landing gear assembly 130 may be in the landing gear down position. After take-off, landing gear assemblies the first landing gear assembly 110, the second landing gear assembly 120, and the third landing gear assembly 130 may be translated to the landing gear up position. Prior to landing, the first landing gear assembly 110, the second landing gear assembly 120, and the third landing gear assembly 130 may be translated to the landing gear down position to support the aircraft 10 during landing.

In various embodiments, securing the first landing gear assembly 110, the second landing gear assembly 120, and the third landing gear assembly 130 in the up position during flight may be desirable. In that regard, in various embodiments, a landing gear lock system, as disclosed herein, is configured to maintain each of the first landing gear assembly 110, the second landing gear assembly 120, and the third landing gear assembly 130 in the landing gear up position. In various embodiments, the landing gear lock system may include a rotating hook configured engage the landing gear in the up position. In various embodiments, the rotating hook is held in place by an over-center mechanism. In various embodiments, the landing gear lock system may include an electrohydrostatic actuator (EHA) configured to translate the over-center mechanism away from over center in order for the hook to release the landing gear so that the landing gear may be deployed.

Figure 2A:
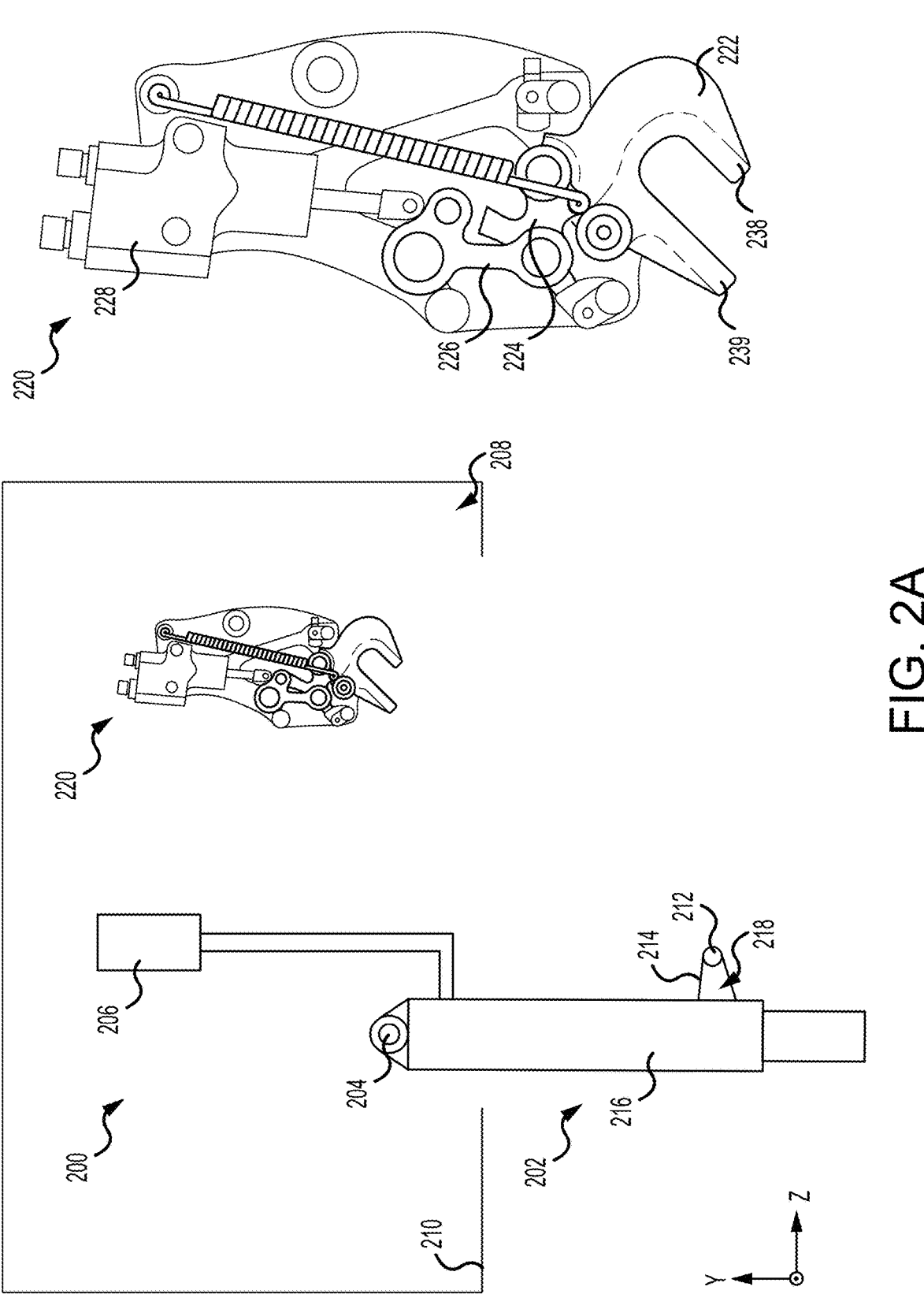
FIG. 2A illustrates a landing gear assembly in the landing gear down position, in accordance with various embodiments.

Referring now to FIG. 2A, in accordance with various embodiments, a landing gear assembly 200, such as the first landing gear assembly 110, the second landing gear assembly 120, or the third landing gear assembly 130 of FIG. 1, is illustrated in the landing gear down position. In accordance with various embodiments, the landing gear assembly 200 includes a landing gear 202 configured to rotate about a pivot joint 204. A retract actuator 206 is operationally coupled to the landing gear 202. The retract actuator 206 is configured to rotate the landing gear 202 about the pivot joint 204. The retract actuator 206 is configured to rotate the landing gear 202 between a landing gear up position and a landing gear down position as well as the landing gear down position and the landing gear up position. The landing gear 202 may be configured to retract into a wheel well 208. In this regard, in the landing gear up position (FIG. 2C), the landing gear 202 may be located within the wheel well 208. The wheel well 208 is defined by an aircraft structure 210. The aircraft structure 210 may be, for example, a portion of the wings 150 or the fuselage 160 in FIG. 1.

A lock system 220 of the landing gear assembly 200 may be located within the wheel well 208. The lock system 220 is configured to engage and maintain the landing gear 202 in the landing gear up position. In various embodiments, the landing gear 202 includes an uplock roller 212. The uplock roller 212 may extend between a pair of lugs 214. The uplock roller 212 may be configured to rotate, or spin, relative to the pair of lugs 214. The uplock roller 212 is spaced apart from a strut cylinder 216 of the landing gear 202. The uplock roller 212, the pair of lugs 214, and the strut cylinder 216 define a volume 218 configured to receive a hook 222 of the lock system 220. In various embodiments, the hook 222 includes a hook end 238 and an interface end 239. In various embodiments, the lock system includes the hook 222, a link 224, a lock lever 226, and an electrohydrostatic actuator (EHA) 228.

Figure 2B:
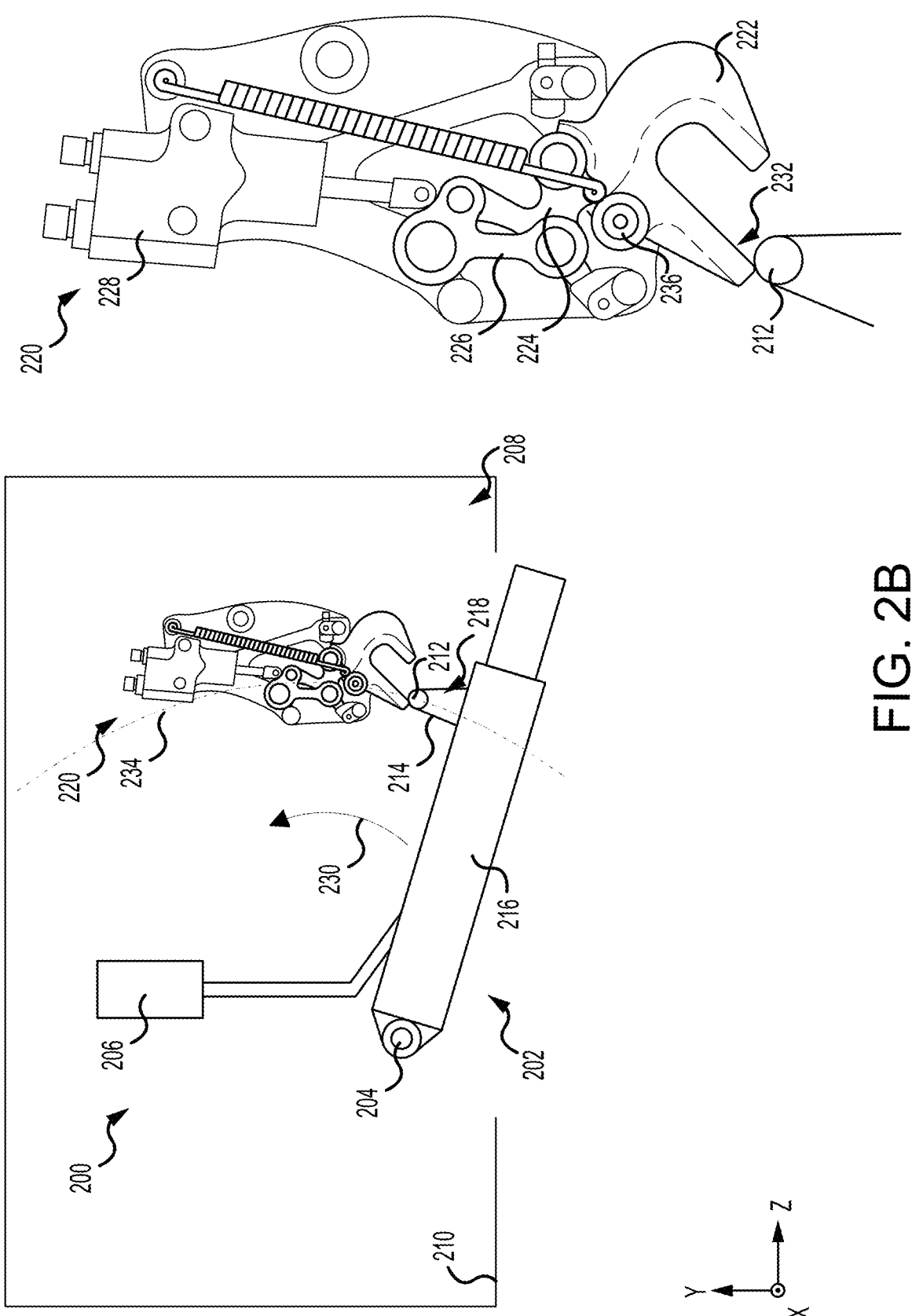
FIG. 2B illustrates landing gear rotating to the landing gear up position, in accordance with various embodiments.

Referring now to FIG. 2B, in accordance with various embodiments, the landing gear 202 rotating to the landing gear up position is illustrated. As the landing gear 202 rotates circumferentially in the first direction 230, the landing gear 202 contacts the hook 222 of the lock system 220. The hook 222 is positioned such that a first interior surface 232 of the hook 222 is in a path 234 of the uplock roller 212. In various embodiments, as the landing gear 202 rotates circumferentially in the first direction 230, the uplock roller 212 contacts the first interior surface 232 of the hook 222. In various embodiments, when the landing gear 202 rotates from the landing gear down position to the landing gear up position, the lock system 220 is in an unlocked state. As described in further detail below, in the unlocked state, the hook 222 of lock system 220 is free, or otherwise allowed, to rotate about a pin 236 of the lock system 220.

Figure 2C:
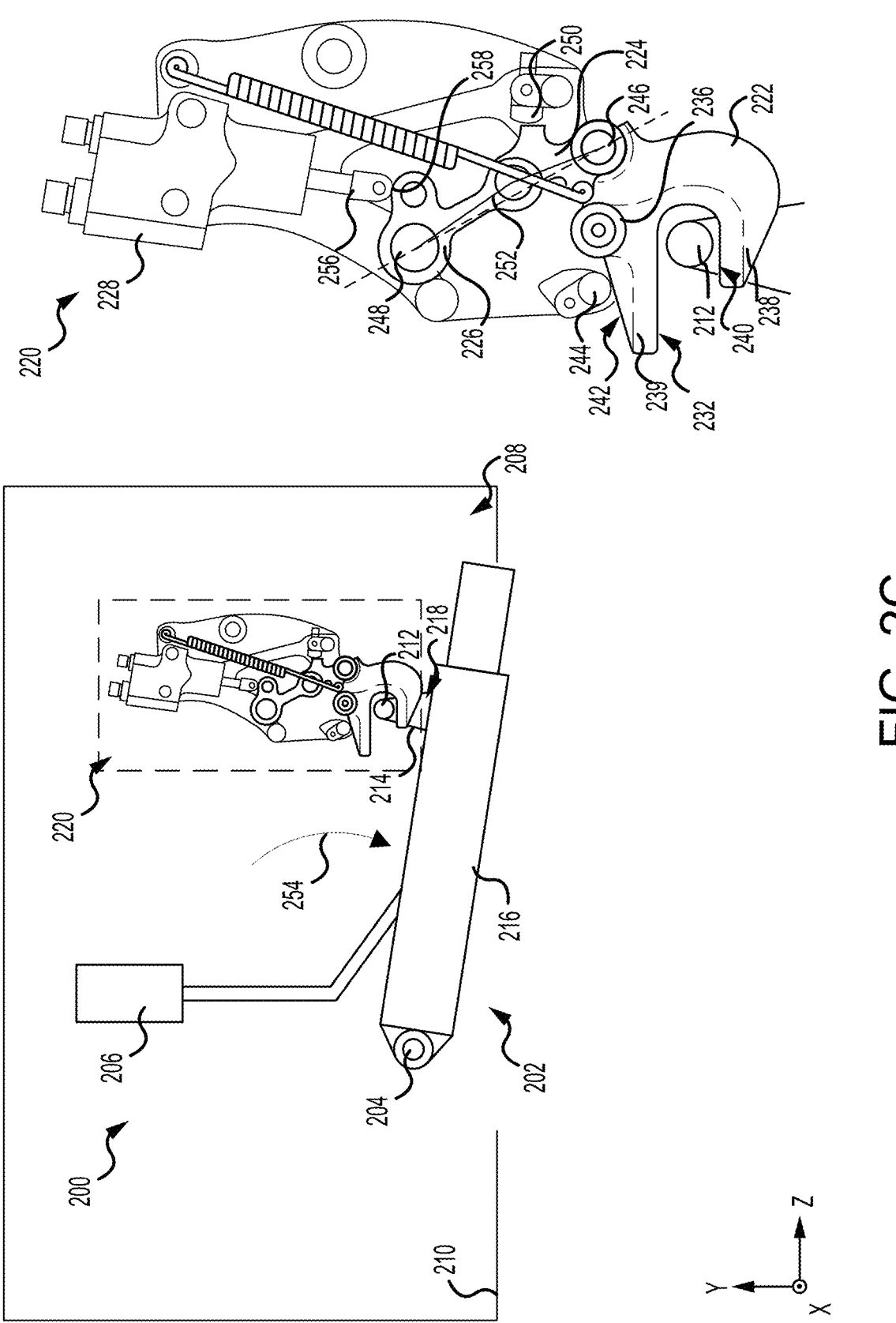
FIG. 2C illustrates a circumferential rotation of a hook in response to contact between an uplock roller of a landing gear with a first interior surface of the hook, in accordance with various embodiments.

Referring now to FIG. 2C, in accordance with various embodiments, a circumferential rotation of the hook 222 in response to contact between the uplock roller 212 of the landing gear 202 and the first interior surface 232 of the hook 222 is illustrated. In various embodiments, in response to the interference between the first interior surface 232 of the hook 222 and the uplock roller 212, the hook 222 rotates circumferentially in a clockwise direction about pin 236. In this regard, in various embodiments, a hook end 238 of the hook 222 rotates into the volume 218 and thus, the uplock roller 212 is positioned between the first interior surface 232 of the hook end 238 of the hook 222 and a second interior surface 240 of the interface end 239 of the hook 222. In various embodiments, the circumferential rotation in the clockwise direction of the hook 222 may be stopped by a first exterior surface 242 of the interface end 239 of the hook 222 contacting stop 244. In various embodiments, in response to the circumferential rotation in the clockwise direction of the hook 222, the link 224 circumferentially rotates in a clockwise direction about pin 246 that couples the link 224 to the hook 222. In that regard, the lock lever 226, which is mechanically coupled to the link 224, circumferentially rotates in a counterclockwise direction about pin 248. In various embodiments, the rotation of the link 224 may be stopped by the link 224 contacting stop 250. It is noted that, in various embodiments, the link 224 and the lock lever 226 rotate to a point that is over a centerline between pin 246 and pin 248, thereby forming an over-center locking mechanism 252. In various embodiments, the over-center locking mechanism 252 blocks, or otherwise prevents, the hook 222 from rotating circumferentially, i.e. placing the lock system 220 in a locked state. In that regard, in response to the lock system 220 be placed in the locked state, the retract actuator 206 is switch to an off state. In the off state, the retract actuator 206 does not support the load of landing gear 202. In this regard, in response to retract actuator 206 being in the off state, the load of the landing gear 202 is transferred to hook 222 of the lock system 220.

In accordance with various embodiments, the retract actuator 206 may be switched to an on state, in response to receiving a landing gear down command from, for example, the cockpit. In various embodiments, the landing gear down command may cause retract actuator 206 to translate the landing gear 202 circumferentially in a second direction 254. In various embodiments, in order for the landing gear 202 to translate circumferentially in the second direction 254, the landing gear down command from the cockpit also causes the EHA 228 to actuate, via an unlock mechanism 256, and act upon the over-center locking mechanism 252 thereby causing the over-center locking mechanism 252 to be overcome so that the landing gear 202 may translate circumferentially in the second direction 254. In that regard, the unlock mechanism 256 of the EHA 228 pushes on an interface 258 of the lock lever 226 which moves the lock lever 226 and the link 224 back over the centerline between pin 246 and pin 248, thereby allowing the hook 222 to rotate circumferentially in a counterclockwise direction so that the retract actuator 206 causes the landing gear 202 to rotate circumferentially about the pivot joint 204 in the second direction 254.

Figure 3:
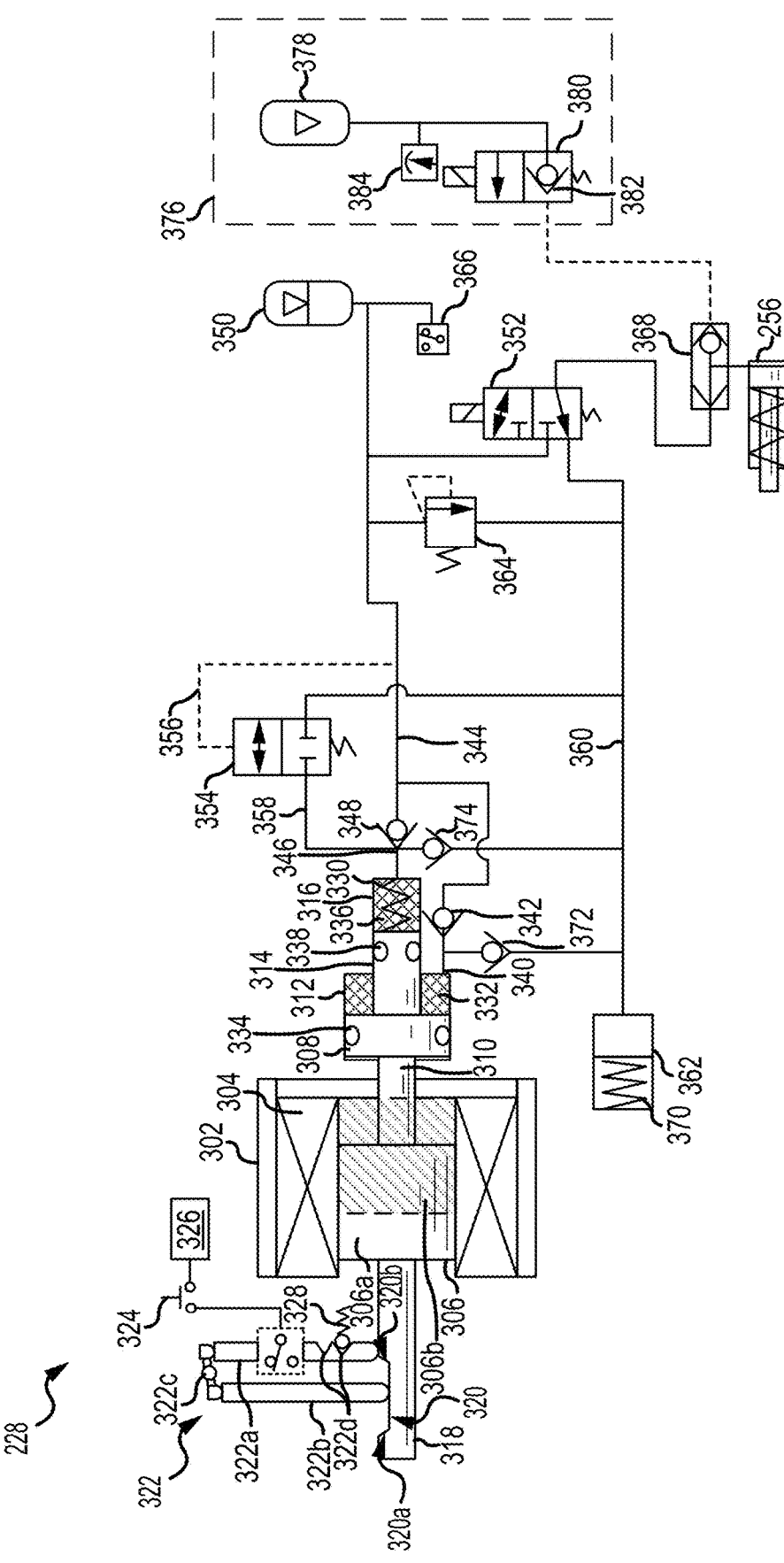
FIG. 3 illustrates an electrohydrostatic actuator (EHA), in accordance with various embodiments.

Referring now to FIG. 3, an electrohydrostatic actuator (EHA), such as EHA 228 of FIGS. 2A, 2B, and 2C, is illustrated, in accordance with various embodiments. In various embodiments, EHA 228 includes solenoid 302. In various embodiments, the solenoid 302 includes a coil 304 and a primary plunger 306 that translates within a center of the coil 304. In that regard, the coil 304 is cylindrical in shape and includes a void in the center in which the primary plunger 306 is positioned. In various embodiments, the primary plunger 306 is manufactured from a ferromagnetic material and, responsive to the coil 304 being electrified, translates in a first direction from a first position 306*a* to a second position 306*b* within the void. In various embodiments, the primary plunger 306 is configured to operate as a hydraulic piston. In that regard, in various embodiments, the primary plunger 306 is mechanically coupled to secondary plunger 308 via first shaft 310. In various embodiments, secondary plunger 308 is positioned within a first chamber 312 and is configured to translate in the first direction as the primary plunger 306. Additionally, the secondary plunger 308 includes an extension 314, the end of which is positioned within a second chamber 316. In that regard, in various embodiments, the extension 314, the secondary plunger 308, and the primary plunger 306 all translate in the first direction in response to power being provided and energizing the coil 304. In various embodiments, responsive to the coil 304 being deenergized, spring 330 in the second chamber 316 causes the extension 314, the secondary plunger 308, and the primary plunger 306 to translate in a second direction opposite the first direction.

In various embodiments, on an opposite end of the primary plunger 306 is a second shaft 318 that includes a cam profile 320. In various embodiments, switch 322 is configured to operate in response to the translation of the primary plunger 306 and the second shaft 318. In that regard, in various embodiments, responsive to a landing gear down command being received from the cockpit or responsive to the accumulator 350 requiring charging, a relay 324 closes and power 326 is provided via the relay 324 to the switch 322. In various embodiments, the switch 322 includes a first piston 322*a* and a second piston 322*b* mechanically coupled together via a rocker 322*c*. In various embodiments, when the power 326 is provided to the switch 322, the first piston 322*a* is in an up position and the second piston 322*b* is in a down position. In various embodiments, responsive to the switch 322 providing power to the coil 304 and the coil 304 being energized, the primary plunger 306 translates in the first direction from the first position 306*a* to the second position 306*b*, which causes the second shaft 318 to translate in the first direction. In various embodiments, the first piston 322*a* and the second piston 322*b* are held in their respective positions via detent 328 that interfaces with grooves 322*d* in the first piston 322*a*. In various embodiments, as the second shaft 318 translates in the first direction, a first ramp 320*a* of the cam profile 320 causes the second piston 322*b* to move to an up position, which in turn causes the first piston 322*a* to move to a down position via the rocker 322*c* thereby disconnecting the power 326 from the coil 304 and which may also disconnect the relay 324.

In various embodiments, in a reverse operation, responsive to the coil 304 being deenergized, the plunger 306 translates in the second direction from the second position 306*b* to the first position 306*a*, which causes the second shaft 318 to translate in the second direction. In various embodiments, as the second shaft 318 translates in the second direction, a second ramp 320*b* of the cam profile 320 causes the first piston 322*a* to move to an up position, which in turn causes the second piston 322*b* to move to a down position via the rocker 322*c,* thereby resetting the switch 322.

In various embodiments, hydraulic fluid 332 is positioned and maintained within the first chamber 312 via seal 334 and hydraulic fluid 336 is positioned and maintained within the second chamber 316 via seal 334 and seal 338. In various embodiments, responsive to the coil 304 being energized and the primary plunger 306 translating in the first direction from the first position 306*a* to the second position 306*b,* the hydraulic fluid 332 is pushed through conduit 340, which is fluidly coupled to the first chamber 312, through a check valve 342, which is fluidly coupled to conduit 340, into manifold 344, which is fluidly coupled to the check valve 342. At a same time, responsive to the coil 304 being energized and the primary plunger 306 translating in the first direction from the first position 306*a* to the second position 306*b,* the hydraulic fluid 336 is pushed through conduit 346, which is fluidly coupled to the second chamber 316, through a check valve 348, which is fluidly coupled to conduit 346, into the manifold 344, which is fluidly coupled to the check valve 348. In various embodiments, the manifold 344 is fluidly coupled to an accumulator 350 and to a directional valve 352.

In various embodiments, responsive to the hydraulic fluid 332 and the hydraulic fluid 336 being pushed through the manifold 344 reaching a predetermined fluid pressure, as detected by unloading valve 354 via conduit 356, the unloading valve 354 switches positions so that the hydraulic fluid 336 from the second chamber 316 is pushed through the conduit 346 and a conduit 358, which is fluidly coupled to conduit 346, through unloading valve 354 into a manifold 360 and further into a reservoir 362. In various embodiments, the fluid pressure in the manifold 344 is greater than the fluid pressure in the manifold 360 and thus the check valve 348 prevents hydraulic fluid from flowing back from the manifold 344. In various embodiments, the predetermined pressure may be between 800 pounds per square inch (PSI) (5.516e+06 newtons/square meter) and 1200 PSI (8.274e+06 newtons/square meter). In various embodiments, the predetermined pressure may be between 900 PSI (6.205e+06 newtons/square meter) and 1100 PSI (7.584e+06 newtons/square meter). In various embodiments, the predetermined pressure may be 1000 PSI (6.895e+06 newtons/square meter). In various embodiments, the pressure of the hydraulic fluid may reach the predetermined pressure based on the accumulator 350 being fully charged and the directional valve 352 being in a closed position.

In various embodiments, responsive to accumulator 350 requiring charging, i.e. not being fully charged, as detected via pressure switch 366, which detects the fluid pressure in manifold 344, the pressure switch 366 will close which causes the relay 324 to close and, through the process described previously, cause the hydraulic fluid 332 being pushed into manifold 344 via the first chamber 312 and the hydraulic fluid 336 from the second chamber 316 being pushed into manifold 344 to charge the accumulator 350 before the predetermined pressure is met at which time the pressure switch 366 will open.

In various embodiments, in an event that the pressure in the manifold 344 reaches an overload pressure as detected by a relief valve 364, which is fluidly coupled to the manifold 344, the relief valve 364 opens and excess hydraulic fluid is released into the reservoir 362. In that regard, the relief valve 364 prevents the pressure in the manifold 344 from overloading.

In various embodiments, responsive to a landing gear down command being received from the cockpit, the relay 324 will close, through the process described previously, cause the hydraulic fluid 332 being pushed into manifold 344 via the first chamber 312 and the hydraulic fluid 336 from the second chamber 316 being pushed into manifold 344. In various embodiments, at a same time and responsive to the landing gear down command being received from the cockpit, the directional valve 352 moves to an open position such that the hydraulic fluid flows through the directional valve 352 and shuttle valve 368 thereby causing unlock mechanism 256 to acuate and act upon the over-center locking mechanism 252 of FIG. 2C thereby causing the over-center locking mechanism 252 to be overcome so that the landing gear 202 of FIG. 2C may deploy. It is noted that the flow of hydraulic fluid in manifold 344 may be augmented by hydraulic fluid in the accumulator 350 in order to size the solenoid 302 smaller than would normally be needed for a certain flow rate that drives the EHA 228 at a certain linear rate.

In various embodiments, as soon as the over-center locking mechanism 252 has been moved back over center by the unlock mechanism 256, the directional valve 352 is moved back to the closed position which provide for the accumulator 350 to be recharged as described previously. In various embodiments, responsive to the accumulator 350 being recharged, the coil 304 is deenergized which allows the extension 314, the secondary plunger 308, and the primary plunger 306 to translate in the second direction opposite the first direction die to the spring 330. With the extension 314 and the secondary plunger 308 translating in the second direction, the fluid pressure in the first chamber 312 and the second chamber 316 is reduced and the hydraulic fluid in the reservoir 362 is pushed, via spring 370 in the reservoir 362, through the manifold 360 and a check valve 372 into the first chamber 312 and through the manifold 360 and a check valve 374 into the second chamber 316.

In various embodiments, in an event where, after a predetermined time period indicating that the landing gear has not been fully deployed, a backup system 376 is provided. In various embodiments, the backup system 376 includes an alternate energy storage device 378, such as a blowdown bottle, a nitrogen bottle, or a hydropneumatics accumulator. In response to the event, an emergency landing gear down command being received from the cockpit activates the directional valve 380, which in normally closed and blocking the flow of hydraulic fluid from the shuttle valve 368 via check valve 382, so that the directional valve 380 is opened and the fluid from the alternate energy storage device 378 flows through the directional valve 380 and shuttle valve 368 thereby causing unlock mechanism 256 to acuate and act upon the over-center locking mechanism 252 of FIG. 2C thereby causing the over-center locking mechanism 252 to be overcome so that the landing gear 202 of FIG. 2C may deploy. It is noted that, in various embodiments, the backup system 376 may include a pressure indicator 384 that provide an indication of the pressure in the alternate energy storage device 378.

Therefore, the electrohydrostatic actuator (EHA) of the illustrative embodiments provides for a uplock or unlock (i.e., unlocking from downlock) mechanism that is more cost-effective by replacing motors, pumps, and/or gear trains associated with electromechanical actuators. The EHA of the illustrative embodiments may be utilized with local powerpack architectures since the unlock EHA eliminates lines and swivels that are needed in legacy designs since these actuators are located on the landing gear through multiple moving joints (e.g., folding side-brace). Finally, the dual cavity/chamber associated with the secondary plunger and the extension increases volume output over a given accumulator re-charge time.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electrohydrostatic actuator (EHA) for unlocking an uplock of an aircraft, the EHA comprising:
a solenoid;
a primary plunger positioned within the solenoid;
a secondary plunger positioned within a first chamber separate from the solenoid, wherein the secondary plunger is mechanically coupled to the primary plunger within the solenoid via a shaft;
a first manifold, wherein the first manifold is fluidly coupled to the first chamber;
an extension, wherein:
    a first end of the extension is mechanically coupled to the secondary plunger,
    a second end of the extension is positioned within a second chamber, and
    the first manifold is fluidly coupled to the second chamber; and
an unlock mechanism,
wherein, responsive to the solenoid being energized, the solenoid is configured to translate the primary plunger in a first direction to push a hydraulic fluid within the first chamber, via the secondary plunger, into the first manifold, via a first check valve, that feeds the unlock mechanism and, at a same time, translate the extension in the first direction to push hydraulic fluid within the second chamber, via the extension, into the first manifold, via a second check valve, that feeds the unlock mechanism, and
wherein, responsive to a command to unlock the uplock of the aircraft, the hydraulic fluid in the first manifold is pushed to the unlock mechanism, thereby causing the unlock mechanism to maneuver an over-centered mechanism over a centerline and unlock an uplocked landing gear.

2. The EHA of claim 1, further comprising:
an unloading valve; and
a reservoir,
wherein, responsive to a pressure in the first manifold exceeding predetermined pressure, the unloading valve redirects a portion of the hydraulic fluid in the first manifold to the reservoir.

3. The EHA of claim 2, further comprising:
a second manifold,
wherein the unloading valve redirects the portion of the hydraulic fluid in the first manifold to the reservoir via the second manifold.

4. The EHA of claim 3, further comprising:
wherein, responsive to the command to unlock the uplock of the aircraft ending, pushing the hydraulic fluid in the reservoir into at least one of the first chamber or the second chamber while the secondary plunger is being spring-returned to a first position from a second position in a second direction opposite the first direction.

5. The EHA of claim 1, further comprising:
an accumulator,
wherein the accumulator is fluidly coupled to the first manifold, and
wherein, responsive to a command to charge the accumulator, the hydraulic fluid in the first manifold is pushed to the accumulator.

6. The EHA of claim 5,
wherein, responsive to the command to unlock the uplock of the aircraft, the hydraulic fluid from the accumulator is pushed to the unlock mechanism thereby causing the unlock mechanism to maneuver the over-centered mechanism over the centerline and unlock the uplocked landing gear.

7. The EHA of claim 1, further comprising:
a relief valve; and
a reservoir,
wherein the relief valve is configured to open in response to an overload pressure in the first manifold, and
wherein, responsive to the relief valve opening in response to the overload pressure, an excess hydraulic fluid in the first manifold is released into the reservoir.

8. The EHA of claim 1, further comprising:
a directional valve,
wherein the command to unlock the uplock of the aircraft activates the directional valve so that the hydraulic fluid in the first manifold is pushed to the unlock mechanism.

9. An aircraft, the aircraft comprising:
a landing gear; and
an electrohydrostatic actuator (EHA) for unlocking the landing gear in an uplocked position, the EHA comprising:
    a solenoid;
    a primary plunger positioned within the solenoid;
    a secondary plunger positioned within a first chamber separate from the solenoid, the secondary plunger is mechanically coupled to the primary plunger within the solenoid via a shaft;
    a first manifold;
    an extension, wherein:
        a first end of the extension is mechanically coupled to the secondary plunger,
        a second end of the extension is positioned within a second chamber, and
        the first manifold is fluidly coupled to the second chamber; and
    an unlock mechanism,
    wherein, responsive to the solenoid being energized, the solenoid is configured to translate the primary plunger in a first direction to push first hydraulic fluid within the first chamber, via the secondary plunger, into the first manifold, via a first check valve, that feeds the unlock mechanism and, at a same time, translate the extension in the first direct direction to push a second hydraulic fluid within the second chamber, via the extension, into the first manifold, via a second check valve, that feeds the unlock mechanism, and
    wherein, responsive to a command to unlock an uplock of the aircraft, the first hydraulic fluid and the second hydraulic fluid are pushed to the unlock mechanism thereby causing the unlock mechanism to maneuver an over-centered mechanism over a centerline and unlock an uplocked landing gear.

10. The aircraft of claim 9, wherein the EHA further comprises:

an unloading valve; and a reservoir, wherein, responsive to a pressure in the first manifold exceeding predetermined pressure, the unloading valve redirects a portion of the hydraulic fluid in the first manifold to the reservoir.

11. The aircraft of claim 10, wherein the EHA further comprises:

a second manifold, wherein the unloading valve redirects the portion of the hydraulic fluid in the first manifold to the reservoir via the second manifold.

12. The aircraft of claim 11, wherein the EHA further comprises:

wherein, responsive to the command to unlock the uplock of the aircraft ending, pushing the hydraulic fluid in the reservoir into at least one of the first chamber or the second chamber while the secondary plunger is being spring-returned to a first position from a second position in a second direction opposite the first direction.

13. The EHA of claim 9, wherein the EHA further comprises:

an accumulator, wherein the accumulator is fluidly coupled to the first manifold, and wherein, responsive to a command to charge the accumulator, the hydraulic fluid in the first manifold is pushed to the accumulator.

14. The aircraft of claim 13, wherein, responsive to the command to unlock the uplock of the aircraft, the hydraulic fluid from the accumulator is pushed to the unlock mechanism thereby causing the unlock mechanism to maneuver the over-centered mechanism over the centerline and unlock the uplocked landing gear.

15. The aircraft of claim 9, wherein the EHA further comprises:

a relief valve; and a reservoir, wherein the relief valve is configured to open in response to an overload pressure in the first manifold, and wherein, responsive to the relief valve opening in response to the overload pressure, excess hydraulic fluid in the first manifold is released into the reservoir.

16. The aircraft of claim 9, wherein the EHA further comprises:

a directional valve, wherein the command to unlock the uplock of the aircraft activates the directional valve so that the hydraulic fluid is pushed to the unlock mechanism.

* * * * *